US007543224B2

(12) United States Patent
Schwartz

(10) Patent No.: US 7,543,224 B2
(45) Date of Patent: Jun. 2, 2009

(54) ARCHITECTURE FOR MANAGING RESEARCH INFORMATION

(75) Inventor: Philip L. Schwartz, Ramsey, NJ (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/443,543

(22) Filed: May 21, 2003

(65) Prior Publication Data

US 2004/0236858 A1    Nov. 25, 2004

(51) Int. Cl.
G06F 17/00 (2006.01)
(52) U.S. Cl. .................................. 715/234; 715/235
(58) Field of Classification Search .............. 715/513, 715/234, 235; 705/36
See application file for complete search history.

(56) References Cited

U.S. PATENT DOCUMENTS

| 6,513,019 | B2 * | 1/2003 | Lewis .......................... 705/35 |
| 6,963,875 | B2 * | 11/2005 | Moore et al. ................ 707/101 |
| 7,039,594 | B1 * | 5/2006 | Gersting ....................... 705/7 |
| 7,076,728 | B2 * | 7/2006 | Davis et al. ................. 715/513 |
| 2001/0049706 | A1 | 12/2001 | Thorne |
| 2001/0056429 | A1 | 12/2001 | Moore et al. |
| 2002/0019844 | A1 | 2/2002 | Kurowski et al. |
| 2002/0198833 | A1 | 12/2002 | Wohlstadter |
| 2003/0004846 | A1 | 1/2003 | Schneider |
| 2003/0050862 | A1 | 3/2003 | Bleicken et al. |
| 2004/0093377 | A1 * | 5/2004 | Lumera et al. ............. 709/203 |

OTHER PUBLICATIONS

Salminen et al., "Requirements for XML Document Database Systems", Proceedings of the 2001 ACM Symposium on Document Engineering, p. 85-94.*
Hicks, et al., "Personal Digital Libraries and Knowledge Management" published Jul. 28, 2001, Journal of Universal Computer Science, vol. 7, No. 7, p. 550-565.*
Apps, et al. "XML: Using an Evolving Standard in Electronic Publishing," copyright 2000, University of Manchester, UK, p. 1-9.*
"Reuters Japan Starts Delivering XML-Formatted Market Data to Global Netrade Securities," http://about.reuters.com/newsreleases/, Dec. 4, 2000, author unknown.

(Continued)

*Primary Examiner*—Amelia Rutledge
(74) *Attorney, Agent, or Firm*—Douglas Lashmit; Hoffman Warnick LLC

(57) ABSTRACT

A system and method for creating financial markets research reports. An architecture is provided for managing and processing research data, comprising: an XML ingestion engine for receiving XML source files, wherein the ingestion engine breaks each source file into a set of XML elements, wherein each XML element includes a data item and metadata that describes the data item, and wherein each XML element includes a link to a document type definition (DTD); an information management system for storing each XML element in a predefined schema, wherein each XML element is searchable via a search engine; a template manager for managing a set of document templates that are used to create research documents; and a workflow system that manages a workflow amongst a set of users creating a research document.

24 Claims, 2 Drawing Sheets

OTHER PUBLICATIONS

"MarketsML Initiative," http://xml.coverpages.org/marketsML.html, date and author unknown.

"XML on Wall Street," Show & Conference at Metropolitan Pavillion, NYC, Nov. 20, 2001, http://lighthouse-partners.com/xml/2001_program.htm.

"Researchsummary releases new Word2RIXML conversion program," http://www.navigateone.com/2002_08_22.asp, Aug. 22, 2002, author unknown.

"Research in a Box from Performance Research," http://www.researchsponsorship.com/researchinabox/rib1.htm, date and author unknown.

"RIXML.org—Overview," http://www.rixml.org/overview/html, date and author unknown.

"Research Information Exchange Markkup Language (RIXML)," http://xml.coverpages.org/rixML.html, date and author unknown.

"XML Schema for Real-Time Financial Information Submitted to Microsoft Windows DNAfs Advisory Council," http://www.microsoft.com/presspass/press/1999/Jun99/Br.., Jun. 16, 1999, author unknown.

* cited by examiner

ARCHITECTURE FOR MANAGING RESEARCH INFORMATION

BACKGROUND OF THE INVENTION

1. Technical Field

The present invention relates to an architecture for managing research information, and more specifically relates to an architecture that utilizes an XML based information management system for managing research data to create financial markets research reports.

2. Related Art

As the amount of money being invested in financial markets continues to grow, the creation, packaging and selling of financial markets research data has become more and more prevalent. Financial markets research data can often be one of the most important tools for investors and money managers in forming investment strategies. Given the volatile nature of most financial markets, access to timely and accurate research data is therefore critical for predicting the performance of stocks and other commodities. Unfortunately, the process of efficiently providing financial markets research data presents significant data processing challenges.

In order to address these challenges, automated processes are required that can effectively handle the many different types of markets and financial instruments, high volumes of research data, the different types of clients, the different types of technologies that exist across a research enterprise, the different types of technologies used by clients, etc. For instance, research reports generated by research enterprises are often compiled from many disparate sources, such as market data vendors, research analysis authors, internal research systems, etc. Often these sources exist in various formats, e.g., MS OFFICE®, RIXML, proprietary XML formats, etc. Accordingly, a mechanism is required that can absorb different formats. Moreover, the source data must be captured and maintained in an environment that can be easily searched by users preparing research reports.

Furthermore, the creation of a research report may require input or review from multiple parties within an enterprise. For instance, an analyst may generate an initial draft of a research report, which may then be edited by a manager, reviewed by a legal department, forwarded to a marketing department, etc. Often these parties may reside at different physical locations and may utilize different information technologies. As a result, many different versions of the research report may exist in different formats throughout the enterprise.

Additionally, even after the research report content is finalized, it must be packaged and delivered in an appropriate format. For instance, the research report may be directed towards institutional clients, as opposed to small investors. The report may comprise a short "flash" report, as compared to an in depth piece. The report may involve a mutual fund, as opposed to a single equity. The report may need to be sent in formats that can support a PDA, Windows, and/or HTML interface. Accordingly, given the numerous possible permutations, the enterprise must maintain hundreds or even thousands of templates to handle the many different possible formats for each such research report.

Moreover, enterprises that provide financial markets research data are under significant scrutiny to avoid any potential legal and/or ethical improprieties. Accordingly, systems are required that can be used to audit the processes involved in creating research reports.

Given the need for accuracy and timeliness in delivering such reports, a robust information management tool is needed for companies generating financial markets research data.

SUMMARY OF THE INVENTION

The present invention addresses the above-mentioned problems, as well as others, by providing an architecture that utilizes an XML based information management system for managing financial markets research data. In a first aspect, the invention provides an architecture for managing and processing research data, comprising: an XML ingestion engine for receiving XML source files, wherein the ingestion engine breaks each source file into a set of XML elements, wherein each XML element includes a data item and metadata that describes the data item, and wherein each XML element includes a link to a document type definition (DTD); an information management system for storing each XML element in a predefined schema, wherein each XML element is searchable via a search engine; a template manager for managing a set of document templates that are used to create research documents; and a workflow system that manages a workflow lifecycle amongst a set of users generating a research document.

In a second aspect, the invention provides a method of generating research reports, comprising: ingesting XML source files; storing individual data elements for each source file in an information management system, wherein each data element includes a data item, metadata and a link to a document type definition (DTD) of the source file; providing a workflow system to track a set of tasks amongst a team of users during the creation of a research report; selecting a template for the research report from a template manager; inserting content into the selected template; tracking and storing editorial changes made to the research report by the team of users; creating at least one outbound DTD that defines the content for the research report; and creating an outbound compound document that defines a publication format for the research report.

In a third aspect, the invention provides a system for managing and processing financial markets research data, comprising: an XML ingestion engine for receiving XML source files, wherein the ingestion engine breaks each source file into a set of XML elements, wherein each XML element includes a data item and metadata that describes the data item, and wherein each XML element includes a link to a document type definition (DTD); an information management system for storing each XML element in a predefined taxonomy; a search engine for searching individually stored XML elements in the information management system; a template manager for managing a set of document templates; an authoring tool for creating a research report, wherein the authoring tool includes a system for selecting one of the document templates as a basis for the research report; and a workflow system for managing a workflow for a set of users creating the research report.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
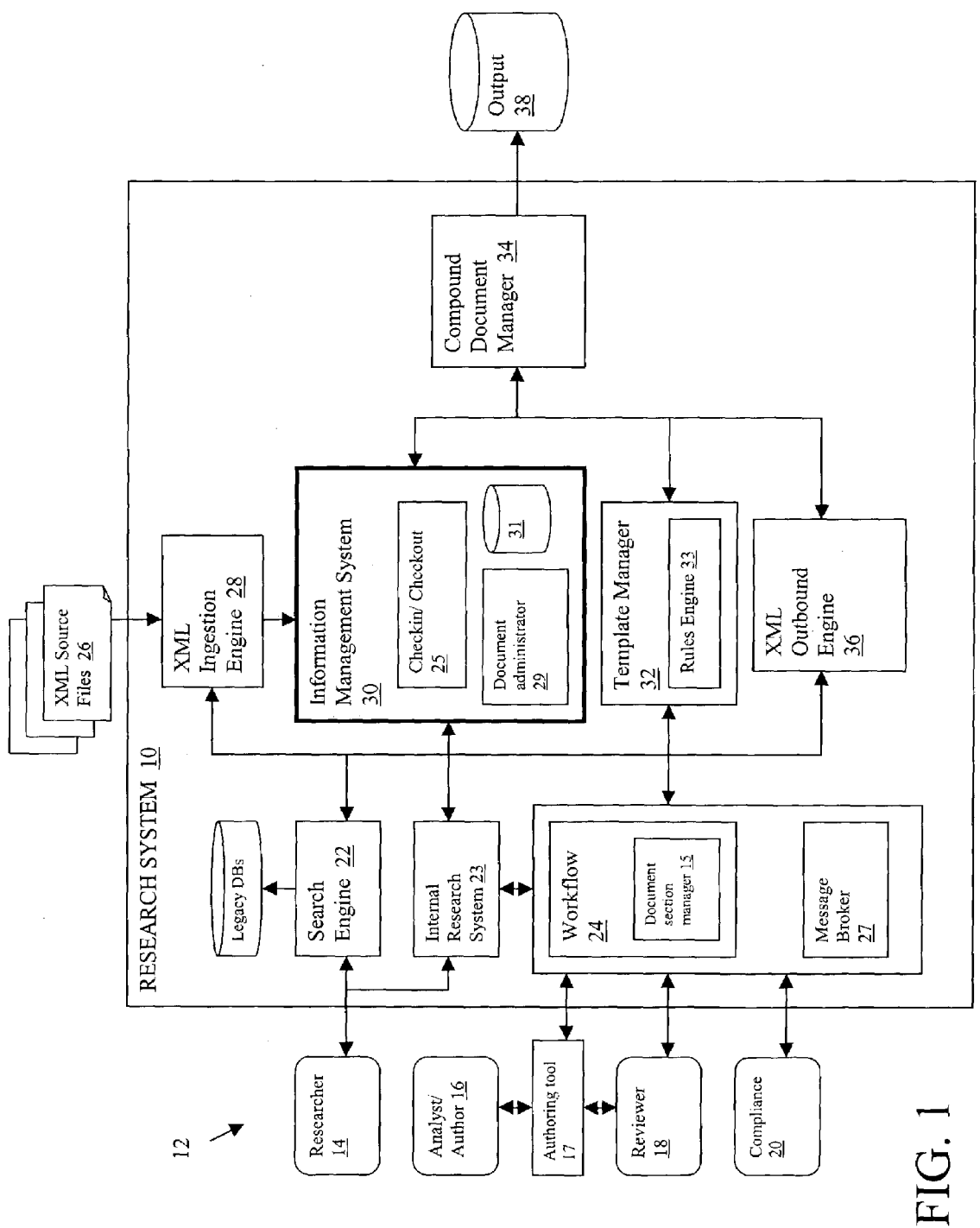
FIG. 1 depicts a research system in accordance with the present invention.

Referring now to the drawings, FIG. 1 depicts a research system 10 for managing research data, and more particularly an architecture for generating research reports. Note that while the exemplary embodiments are described herein with reference to an architecture for managing financial markets research data within a large enterprise, it should be understood that the invention could be applied to the management of any XML data in any environment. It should also be understood that the placement and specific implementation of the functional "boxes" within FIG. 1 are for exemplary purposes only, and their exact placement and implementation within the overall architecture may be changed without departing from the scope of the invention.

As noted above, financial markets research reports are often compiled using data from a variety of sources (i.e., "source data"). In the present invention, source data is generally entered into the research system 10 from XML source files 26. XML source files 26 may originate from any source, e.g., from market data vendors, research analysis authors, internal research systems 23, etc. Moreover, XML source files 26 may be received in different XML formats, e.g., RiXML (Research Information exchange Markup Language), FpML (Financial Products Markup Language), XBRL (eXtensible Business Reporting Language), other proprietary XML formats, etc. Whenever a source file 16 is entered, XML ingestion engine 28 "ingests" the inbound XML document type definition (DTD) and breaks the file into a set of elements, with each element including: (1) data; (2) metadata that describes the data; and (3) a link to the original DTD. The elements are mapped into a predefined taxonomy or schema, for instance using index classes, and are stored in a database 31 residing within the information management system (IMS) 30. For instance, an XML source document may be received as follows:

```
<title> Document1 </title>
<fields>
<field 1> This is field 1 </field1>
<field 2> This is field 2 </field2>
<field 3> This is field 3 </field3>
<field 4> This is field 4 </field4>
</fields>
```

Within the information management system 30, the source data could be stored as:

```
Title Document1
Field1 This is field 1
Field2 This is field 2
Field3 This is field 3
Field4 This is field 4
```

The stored taxonomy or schema of the source data may be defined and implemented in any manner including, e.g., a user defined, system defined or hybrid taxonomy. In one exemplary embodiment, the ingested source data is stored in a RiXML format. Note that the ingestion of non-XML source files (e.g., PDF, Microsoft Office, image files, etc.) into IMS 30 could be supported by implementing a decomposition system that would decompose such files and map them into the defined taxonomy.

The information management system 30 provides a central open repository for research data in which unstructured data elements are stored in a predefined fashion or taxonomy. Information management system 30 may also include or support numerous features for effectively managing the data, such as a document administrator 29. Moreover, the source data is stored in a manner such that individual data elements and/or documents can be easily searched or manipulated from anywhere using any type of client device, e.g., using XQuery. Search queries may include the ability to visually traverse a lexical taxonomy or navigate to any node in the taxonomy. Moreover, historical information can be maintained for each data element or document to facilitate workflow, auditing, and compliance requirements.

In some instances, customers may want to utilize existing components (e.g., a proprietary authoring tool or search facility) that are not directly compatible with research system 10. In these cases a message broker 27 may be utilized to provide message based system-to-system connectivity. This enables the research system 10 to connect (i.e., pass information back and forth) asynchronously to various types of applications within a customer's environment. In general, the message broker 27 is used to move information and transactions, and send alerts that require a system/application response.

Within research system 10, each research report may be generated within a unique workflow lifecycle that is managed by workflow system 24. The lifecycle may include any number of activities, e.g., creation, review, approval, etc. Access to data within the information management system 30 may therefore be controlled by the workflow system 24, which is capable of interfacing with any number of different users, using disparate information technology, across an enterprise. Thus, the creation of research reports for distribution to customers can be implemented and managed in a secure and controlled environment. In general, workflow system 24 is used within the research system 10 to move information and send alerts that require a human response or interaction, e.g., via a software interface.

An example of how workflow system 24 operates within research system 10 is as follows. An enterprise may need to generate a financial research report that discusses a particular financial instrument. To achieve this, the enterprise may put together a team 12 of users, comprised of a researcher 14, an analyst/author 16, a reviewer 18 and a compliance specialist 20. Workflow system 24 can be configured to control and manage the flow of tasks or lifecycle among the team 12. For example, researcher 14 may be required to search for relevant information pertaining to the particular financial instrument. Using search engine 22 and an internal research system 23, relevant research data stored in the information management system 30 (such as financial information provided by market vendors, existing reports, etc.) can be identified and compiled by the researcher 14. Using workflow system 24, researcher 14 can inform the analyst/author 16 of the identified research data relevant to the financial instrument, and have the information forwarded along to the analyst/author 16.

Using the research data, analyst/author 16 may then prepare a draft of a research report discussing the financial instrument. The analyst/author 16 would generally utilize an authoring tool 17 to select a template geared for the particular type of report being written. Template manager 32 maintains a set of templates in a centralized location, such that managing a large number of templates can be efficiently implemented. Once the template is selected, the analyst/author 16 can use the authoring tool to add content into a set of fields defined within the template. In some instances, the analyst/author 16 may want to insert existing document elements or fragments, such as a table or a chart, found in the research data identified by the researcher 14. Compound document manager 34 provides a system for linking together elements stored in IMS 30 with the selected template to create a virtual document. Thus, new documents can be created using elements from existing documents simply by linking existing data elements from IMS 30 into the current template. After the draft is complete, the draft can be "checked-in" to the document administrator within IMS 30 via the workflow management system 24 using check-in/check-out system 25.

Workflow system 24 can then automatically forward a notification to a reviewer 18 that a draft is complete and ready for review. The reviewer 18, e.g., a manager, can review the draft and take some further action, e.g., edit or approve/reject it. If necessary, the reviewer 18 may "check-out" the draft, make editorial changes, and then check the draft back into IMS 30. In this manner, an audit trail is created showing which user edited the report, and what changes the user made. It also provides an environment for an enterprise-wide collaborative effort in authoring documents.

Once the report is approved, workflow system 24 can forward the report to a compliance specialist 20, e.g., a lawyer. The compliance specialist 20 may likewise check-out the research report from IMS 30, edit the report, and check it back in.

To further enhance efficiency, workflow system 24 may be configured to selectively manage sections of the research report using document section manager 15. Document section manager 15 allows different sections of each document to be subject to an independent "child" lifecycle. In this manner, different sections of a document can be controlled to flow through different team members during the overall "parent" lifecycle. Thus, document components, categories, modules, fragments, fields, or data of any defined granularity can be independently managed by workflow system 24. This feature allows for a more efficient workflow lifecycle by dividing the flow of information among team members. For example, document section manager 15 may be configured to forward only document fragments labeled with the tag <legal disclaimer> to the compliance specialist 20. Thus, in this case, a lawyer need not review an entire 60 page report to locate the two or three pages of relevant compliance information.

To implement independent child lifecycles, document section manager 15 can operate on XML DTD information groupings to control and manage the flow of information among team members. For example, an RiXML DTD includes four main categories of information held within the DTD: Source Information, Legal Information, Context Information and Content & Resource Information. Within a Financial Markets firm, a compliance specialist might only be interested in the review of the information contained within the Legal Information section of the DTD. Via a predefined rule set up by rules engine 33, document section manager 15 can be configured to automatically send only the Legal Information section of the document to the compliance department work group (or individual) for approval, with the remaining sections of the document being sent to the marketing department for review and approval.

Moreover, once a section of a document is approved, the approval can be attached to the section and re-used if appropriate. For instance, if an approved section of a document is reused in a later document, then it may be unnecessary to later obtain approval for the same section.

Thus, the various groupings of information within a standard or user defined XML DTD can have independent management and approval lifecycles, and the release (final approval) of the entire parent DTD can be dependent upon the completion of the independent lifecycles of the children groupings. This functionality can also be leveraged to more easily audit research documents since it can be readily determined which team member worked on and/or approved what section.

Once the workflow lifecycle is completed, the research report could be marked as ready for publishing. The creation of an outbound XML DTD is handled by the XML outbound engine 36. This outbound DTD can be of any XML format. Thus, it need not be impacted by any of the in bound XML formats by which the information may have been initially received. XML outbound engine 36 creates outbound file having an XML DTD that defines the content of the research report.

The Compound Document Manager 34 handles the formatting and or publishing of the document. It uses the content provided by the outbound XML DTD to populate the document template. In some instances, a report may need to be generated in different formats depending on the information technology needs of the customer. For instance, some customers may require data formatted for a wireless PDA or a cell phone, while others may require HTML or PDF files for a workstation or laptop. A rules engine 33 can be implemented to select and create the correct output formats to handle the different scenarios based on, e.g., the customer needs, the report type, etc.

The assembly process used by the Compound Document Manager 34 can be XML and/or template driven. The formatting information may be defined by static, dynamic or by a static-dynamic combination of rules information. As noted above, the compound document manager 34 may handle the process of pulling in linked or disparate data from different sources.

In the following example, a report may need to be generated in the following four ways:

Output 1—Recreate the original document for publishing in XML format:

```
<title> Document1 </title>
<fields>
<field 1> This is field 1 </field1>
<field 2> This is field 2 </field2>
<field 3> This is field 3 </field3>
<field 4> This is field 4 </field4>
</fields>
```

Output 2—Only the Title and Field 4 for a PDA in XML format:

```
<title> Document1 </title>
<field 4> This is field 4 </field4>
```

Output 3—Only the 4 fields, with other header information, in reverse order for syndication to a portal in XML format:

```
<header> Other header information</header>
<field 4> This is field 4 </field4>
<field 3> This is field 3 </field3>
<field 2> This is field 2 </field2>
<field 1> This is field 1 </field1>
```

Output 4—All of the fields in a text format:

| |
|---|
| Document 1 |
| This is field 1 |
| This is field 2 |
| This is field 3 |
| This is field 4 |

Obviously, the workflows and examples described above are for exemplary purposes only, and many variations or implementations of a workflow could be implemented in accordance with the invention.

Figure 2:
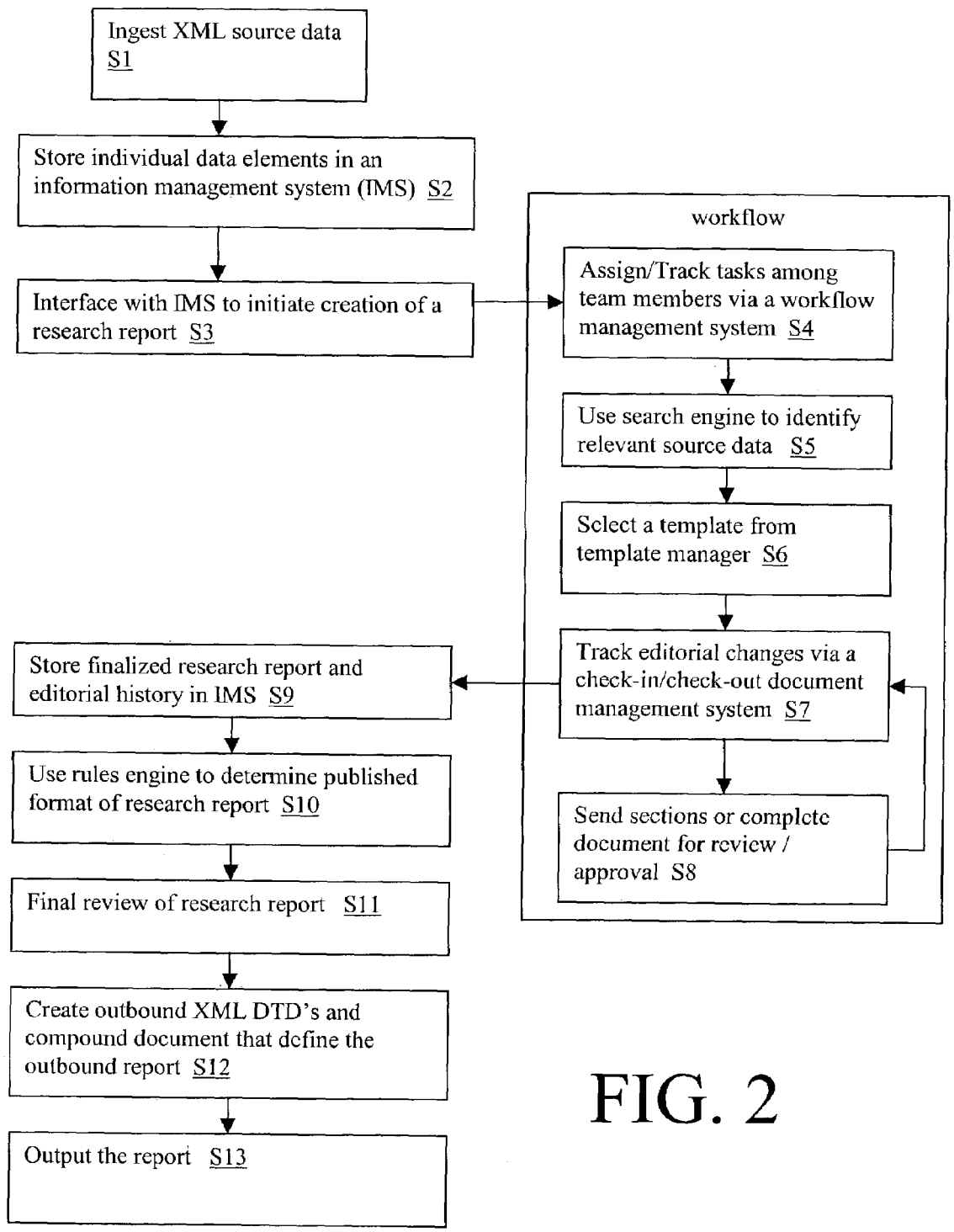
FIG. 2 depicts a flow diagram of a method of implementing the present invention.

FIG. 2 depicts a flow diagram an exemplary methodology for implementing the invention. At step S1, XML source data is ingested. As noted above, source data may include vendor data, internal research data, etc., and be received in different XML formats. The source data is broken up into its individual data elements and stored in an information management system (IMS) in a predefined schema or taxonomy at step S2. Data elements are stored with metadata and links to the original DTD. An interface, e.g., an authoring tool, can then be utilized to initiate creation of a research report at step S3. Creation of the research report takes place within a workflow environment in which tasks can be assigned and/or tracked among team members via a workflow management system at step S4. A search engine or other internal research systems can be utilized to identify relevant source data previously ingested into the IMS at step S5.

Next, a template can be selected for the research report from a set of templates managed by a template manager at step S6. As the report is created, it may be passed around among team members for various editorial, review, and compliance tasks. Editorial changes, approvals, etc., can be tracked via a document administrator and a check-in/check-out system at step S7. As part of the creation lifecycle, sections and/or the complete document can be passed back and forth among different users for review/approval at step S8. Once a finalized version of the research report is created, it is stored along with the editorial history in the IMS at step S9.

Next, at step S10, a rules engine and a compound document manager can be implemented to determine the required publish format or formats of the research report based on a set of business rules. At step S11, an opportunity is provided to perform a final review of the research report. For instance, an individual from the marketing department may be required to review the document to ensure that it is presented in an acceptable manner. Then, at step S12, outbound XML DTD's are created which define the outbound research report. Finally, at step S113, the research report is outputted.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A computer-executable architecture for managing and processing research data, the computer-executable architecture comprising:
   a computer hardware apparatus; and
   a computer program that, when loaded and executed, controls the computer hardware apparatus such that it carries out:
      receiving source data, the source data comprising one of: XML source files and non-XML source files;
      where the received source data comprises non-XML source files, decomposing the non-XML source files and mapping the decomposed non-XML source files on a defined taxonomy;
      where the received source data comprises XML source files, breaking each XML source file into a set of XML elements,
         wherein each XML element includes a data item and metadata that describes the data item, and
         wherein each XML element includes a link to a document type definition (DTD), and
      storing each XML element in a predefined schema, wherein each XML element is searchable via a search engine;
      managing a set of document templates that are used to create research documents; and
      managing a workflow lifecycle amongst a set of users generating a research document, including assigning and tracking tasks among the set of users.

2. The computer-executable architecture of claim 1, wherein the receiving includes ingesting different XML source file formats.

3. The computer-executable architecture of claim 1, wherein the workflow lifecycle includes creating, reviewing and approving the research document.

4. The computer-executable architecture of claim 1, wherein the computer hardware further carries out creating different XML source file formats.

5. The computer-executable architecture of claim 1, wherein the computer hardware further carries out creating an outbound document having a least one XML DTD.

6. The computer-executable architecture of claim 5, wherein the computer hardware further carries out selecting the at least one XML DTD or a set of information fragments for the outbound document based on an outbound requirement.

7. The computer-executable architecture of claim 6, wherein the outbound requirement includes a type of client device that will receive the outbound document.

8. The computer-executable architecture of claim 1, wherein the workflow lifecycle managing includes managing a document section and assigning independent lifecycles to sections of the research document.

9. The computer-executable architecture of claim 8, wherein at least one of the sections of the research document comprises data relevant for a compliance requirement.

10. The computer-executable architecture of claim 1, further comprising an enterprise search engine for searching stored data.

11. The computer-executable architecture of claim 10, wherein the enterprise search engine further includes searching legacy databases.

12. The computer-executable architecture of claim 1, wherein the computer hardware further carries out managing a compound document and allowing a new document to be built from existing stored document data.

13. The computer-executable architecture of claim 1, wherein the computer hardware further carries out administering a document including checking in/checking out the document for tracking document data.

14. A method of generating research reports, comprising:
ingesting source data, the source data comprising one of: XML source files and non-XML source files;
where the ingested source data comprises non-XML source files, decomposing the non-XML source files and mapping the decomposed non-XML source files on a defined taxonomy;
storing individual data elements for each source file in an information management system, wherein each data element includes a data item, metadata and a link to a document type definition (DTD) of the source file;
providing a workflow system to track a set of tasks during a workflow lifecycle amongst a team of users during the creation of a research report;
selecting a template for the research report from a template manager;
inserting content into the selected template;
assigning and tracking editorial tasks, and storing editorial changes made to the research report by the team of users;
creating at least one outbound DTD that defines the content for the research report; and
creating an outbound compound document that defines a publication format for the research report, the publication format comprising one of: data formatted for a wireless PDA or a cell phone, an HTML file, or a PDF file.

15. The method of claim 14, wherein the step of inserting content into the selected template includes the step of linking a document fragment from the information management system into the selected template.

16. The method of claim 14, comprising the further step of storing a final version of the research document in the information management system.

17. The method of claim 14, comprising the further step of providing a rules engine to determine the at least one outbound DTD and to generate a compound document based on a set of business rules.

18. The method of claim 14, comprising the further step of providing a message broker for interfacing with at least one existing customer application.

19. A computer system for managing and processing financial markets research data, comprising:
a computer hardware apparatus; and
a computer program that, when loaded and executed, controls the computer hardware apparatus such that it carries out:
receiving source data, the source data comprising one of: XML source files and non-XML source files;
where the received source data comprises non-XML source files, decomposing the non-XML source files and mapping the decomposed non-XML source files on a defined taxonomy;
where the received source data comprises XML source files, breaking each XML source file into a set of XML elements,
wherein each XML element includes a data item and metadata that describes the data item, and
wherein each XML element includes a link to a document type definition (DTD), and
storing each XML element in a predefined taxonomy;
searching individually stored XML elements in the information management system;
managing a set of document templates;
creating a research report, wherein the authoring tool includes a system for selecting one of the document templates as a basis for the research report; and
managing a workflow lifecycle for a set of users creating the research report,
including assigning and tracking tasks among the set of users.

20. The computer system of claim 19, wherein the computer hardware further carries out packaging the research report as an outbound document, wherein the outbound document includes an XML DTD.

21. The computer system of claim 20, wherein the computer hardware further carries out selecting the XML DTD based on an outbound requirement.

22. The computer system of claim 19, wherein the computer hardware further carries out allowing existing document data stored in the information management system to be automatically linked into the research report.

23. The computer system of claim 19, wherein the workflow lifecycle managing includes managing sections of the research report using an independent lifecycle.

24. The computer system of claim 23, wherein at least one of the sections comprises compliance information.

* * * * *